T. Blanchard,
Spoke Lathe.
Nº 3,008.      Patented Mar. 21, 1843.
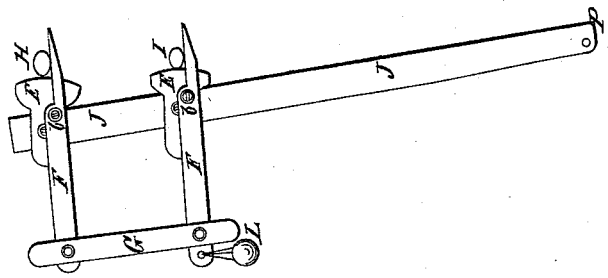
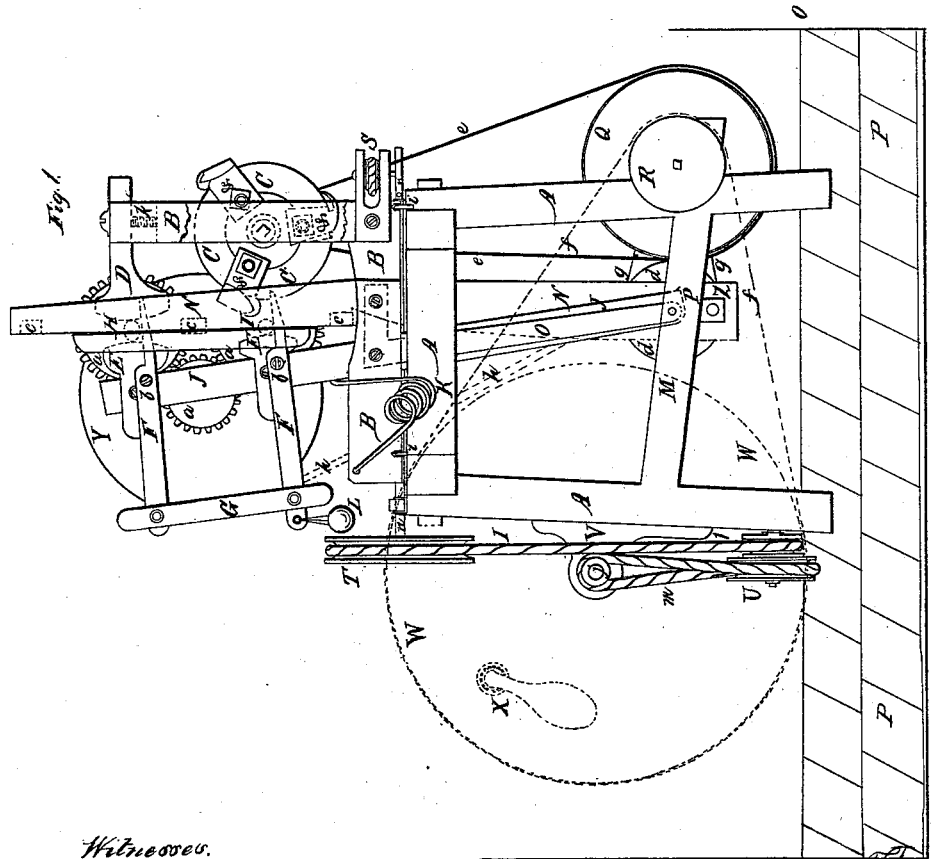
Witnesses.
Francis Adams
Henry Adams
Inventor.
Thos Blanchard

UNITED STATES PATENT OFFICE.

THOS. BLANCHARD, OF BOSTON, MASSACHUSETTS.

MACHINE FOR TURNING OR CUTTING IRREGULAR FORMS.

Specification of Letters Patent No. 3,008, dated March 21, 1843.

*To all whom it may concern:*

Be it known that I, THOMAS BLANCHARD, of the city of Boston and Commonwealth of Massachusetts, have invented a new and useful Improvement in Machines for Turning or Cutting Irregular Forms, which was patented September 6, 1819, and afterward by a corrected specification January 20, 1820, being a back and under rest; and I do hereby declare that the following is a full and exact description thereof.

This improvement consists in a back and under rest applied to the machine for turning or cutting irregular forms, which renders the machine more useful for turning long articles in preventing the springing or trembling of the article, while in the operation of turning, and enables the work to be performed with much greater dispatch than the original method of turning. This improvement can be applied to most of the machines now in use—but the form of the machine herein described with an end view drawing is believed to be the most convenient form for applying this improvement.

Figure 1 shows an end view of the original machine with the improvement attached, the original machine being only sufficiently shown to enable a workman to apply the improvement, the improvement being more fully shown in Fig. 2. A A A is a platform frame standing on four legs of sufficient dimensions to accommodate the work to be performed. B B B is the sliding carriage containing the cutting wheel, and friction wheel, or friction point which the pattern H rests against while in the operation. This carriage slides on ways I I in a horizontal direction the whole length of the article to be formed. D is the friction point or curve formed of one fourth greater radius than the cutting wheel. C C C is the cutting wheel and is placed in the sliding carriage directly under the friction point and contains three cutters or more. Said wheel is driven by a belt passing around a pulley in the usual way. N N is the end view of the rocking lathe shown by dotted lines in a perpendicular position formed of two end pieces connected together by three cross ties *c c c* and connected at the bottom to cross girts M in the platform by pivot screws P on which said lathe rocks or turns when in operation. On this lathe are fixed the pattern H and rough material, I, the pattern resting against the center of the friction point and the rough material against the center of the cutting wheel. The pattern and rough material are fixed in said lathe in the usual method and connected by gear wheels at one end to give them both the same revolving motion in the same direction, and in the same direction of the cutting wheel.

Fig. 2 shows the whole of the improvement together with one end view of the pattern and rough material. J J is what I shall term a rocking stock. It is about four feet long standing perpendicular and opposite to the rocking lathe. The lower end is connected to a horizontal shaft about one foot long turning on pivots or journals at the fulcrum P. Said pivots or journals have their bearings in hangers made fast to the sliding carriage and extending down sufficiently to bring the pivots in a line with the pivots of the rocking lathe. One of said hangers is shown in Fig 1 at, O, the other being opposite and not shown in the drawing. Said rocking stock moves with the sliding carriage but has a rocking movement on said pivots at right angles with the movement of the sliding carriage. E E are back rests which are bolted on to the stock. The upper rest is near the top and opposite the friction point and pattern; the other, or lower one is one foot below and opposite the cutting wheel and rough material. The face of said rests are about five inches long, and one inch wide on the face and formed of a curve to correspond with the curve or radius of the friction curve and cutting wheel. These rests, should be faced with steel to prevent them from wearing by the pattern and rough material. The curve of the friction point and upper back rest must be one fourth greater radius than the curve of the lower back rest and cutting wheel; also the diameter of the pattern must be one fourth larger than the diameter of the article to be formed. F F are the under rest levers. They are about eighteen inches long and are connected to the side of the rocking stock about five inches from their rest and by pivot pins *b b* on which they turn close by the side of the back rests and one and one-half inches below their centers. The face side that comes in contact with the pattern and rough material is straight and about three fourths of an inch thick made of hard material. The outer or lower end of said under rests are connected together by a connecting link G. This link is connected to said rest levers by pin bolts which allows them to turn freely. The weight L attached at the end of the lower lever keeps the upper lever against the underside of the pattern and the lower lever against the underside of the rough material and prevents it from springing downward by the action of the cutting wheel. These rest levers follow close after the cutting wheel and friction point. This weight may be varied according to the pressure required against the article formed.

The spring K, Fig. 1, is attached to the sliding carriage and bears back the rocking stock by the back rest coming against the pattern H and rough material I which carries back the rocking lathe till the back side of the pattern comes in against the friction wheel or friction point. This spring must be of sufficient power to keep the pattern in close contact with the friction point and the back rest against the pattern throughout the whole operation of turning.

Having described my improvement, and its operation, I would state that its positon may change while the effect produced is the same, the fulcrums of the rocking lathe and rocking stock may be reversed which would give them a swinging motion, instead of a rocking motion like the lathe described in the patent for turning irregular forms, or they may be placed in a horizontal position or otherwise.

What I claim in this improvement and wish to secure by Letters Patent is—

The combination of fixtures as substantially shown in Fig. 2 and specification describing the same to prevent the tremulous motion of the article turned in the lathe for turning or cutting irregular forms.

THOS. BLANCHARD.

Witnesses:
FRANCIS ADAMS,
HENRY ADAMS.